United States Patent
Shibayama et al.

(10) Patent No.: US 9,261,431 B2
(45) Date of Patent: Feb. 16, 2016

(54) ENGINE CONTROL APPARATUS AND CONTROL METHOD FOR THE SAME

(71) Applicants: FUJITSU TEN LIMITED, Kobe-shi, Hyogo (JP); TOYOTA JIDOSHA KABUSHIKI KAISHA, Toyota-shi, Aichi (JP)

(72) Inventors: Masashi Shibayama, Kobe (JP); Masatoshi Watanabe, Kobe (JP); Yusuke Suzuki, Hadano (JP); Hiroshi Sawada, Gotenba (JP)

(73) Assignees: FUJITSU TEN LIMITED, Kobe-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/432,035

(22) PCT Filed: Oct. 2, 2013

(86) PCT No.: PCT/JP2013/076844
§ 371 (c)(1),
(2) Date: Mar. 27, 2015

(87) PCT Pub. No.: WO2014/057850
PCT Pub. Date: Apr. 17, 2014

(65) Prior Publication Data
US 2015/0253220 A1    Sep. 10, 2015

(30) Foreign Application Priority Data

Oct. 11, 2012    (JP) .................................. 2012-226260

(51) Int. Cl.
*G06F 19/00* (2011.01)
*G01M 15/02* (2006.01)
(Continued)

(52) U.S. Cl.
CPC ............. *G01M 15/02* (2013.01); *F02D 35/023* (2013.01); *F02D 41/222* (2013.01); *F02D 41/28* (2013.01); *G01M 15/042* (2013.01); *F02D 2041/281* (2013.01); *Y02T 10/40* (2013.01)

(58) Field of Classification Search
CPC ... F02D 35/023; F02D 41/222; F02D 35/024; F02D 2041/288
USPC .......... 701/30.4, 111; 73/114.16; 123/406.17, 123/435
See application file for complete search history.

(56) References Cited

U.S. PATENT DOCUMENTS 5,168,854 A  *  12/1992  Hashimoto ........... F02D 35/023
                                              123/406.17
5,269,277 A  *  12/1993  Kuroda .............. F02M 25/0809
                                              123/198 D (Continued)

FOREIGN PATENT DOCUMENTS

JP    H04-103859      4/1992
JP    2007-024825 A   2/2007

*Primary Examiner* — McDieunel Marc
(74) *Attorney, Agent, or Firm* — Oliff PLC

(57) ABSTRACT

An engine control apparatus includes a stack detecting unit, a count processing unit, a stack value storage control unit, and an abnormality determination unit. The abnormality determination unit determines that a sensor has a stack abnormality when a count value by the count processing unit becomes equal to or more than an abnormality determination threshold. When maximum value of the detected value of the sensor detected during a determination period is lower than a value stored in a storage unit and a stack state has not been detected by the stack detecting unit during the determination period, the count processing unit does not count up a counter and does not reset the counter.

6 Claims, 4 Drawing Sheets

(51) Int. Cl.
  *F02D 41/22* (2006.01)
  *F02D 41/28* (2006.01)
  *F02D 35/02* (2006.01)
  *G01M 15/04* (2006.01)

(56) References Cited

U.S. PATENT DOCUMENTS

| | | | | |
|---|---|---|---|---|
| 5,327,867 A | * | 7/1994 | Hisaki | F02P 11/00 123/406.14 |
| 5,337,716 A | * | 8/1994 | Fukui | F02D 35/021 123/406.14 |
| 5,554,801 A | * | 9/1996 | Watanabe | F02D 35/023 73/1.66 |
| 5,598,821 A | * | 2/1997 | Terata | F02P 17/12 123/406.27 |
| 6,012,438 A | * | 1/2000 | Joos | F02D 41/4154 123/198 D |
| 6,474,306 B2 | * | 11/2002 | Muller | F02D 41/22 123/295 |
| 6,935,313 B2 | * | 8/2005 | Jacobson | F02D 35/023 123/406.22 |
| 8,538,666 B2 | * | 9/2013 | Buslepp | F02D 35/023 123/406.17 |
| 9,099,700 B2 | * | 8/2015 | Miyata | H01M 8/04253 |
| 2003/0041840 A1 | * | 3/2003 | Hiltner | F02D 41/1498 123/406.42 |
| 2005/0084745 A1 | * | 4/2005 | Colello | H01M 8/04679 429/61 |

\* cited by examiner

SENSOR NORMAL STATE → UPPER-SIDE STACK STATE

ENGINE CONTROL APPARATUS AND CONTROL METHOD FOR THE SAME

CROSS-REFERENCE TO RELATED APPLICATIONS

This application is national stage application of International Application No. PCT/JP2013/076844, filed on Oct. 2, 2013, which designates the United States, incorporated herein by reference, and which claims the benefit of priority from Japanese Patent Application No. 2012-226260, filed on Oct. 11, 2012, the entire contents of which are incorporated herein by reference.

FIELD

The present invention relates to a method for determining an abnormality of a sensor provided in an engine.

BACKGROUND

Conventionally, when an engine of an automobile and the like is controlled, various sensors such as a cylinder pressure sensor detect various situations such as a combustion state of the engine, and an optimal fuel control and the like is performed based on the detection result. Therefore, it is necessary to accurately detect an abnormal state of the sensor for detecting the state of the engine.

As a failure state of the sensor, there is a failure state called as a so-called stack abnormality in which there is an output range where a sensor value is output properly and the sensor value in a certain output range stays at a constant value. The stack abnormality is different from a simple fixing abnormality. In order to control the engine with high accuracy, it is necessary to accurately detect the stack abnormality. For example, as a technique to detect the abnormality of the cylinder pressure sensor of the engine, there is a technique for determining that the cylinder pressure sensor has the abnormality when an output change (deviation amount) is equal to or less than a predetermined value (for example, refer to Patent Literature 1).

CITATION LIST

Patent Literature

Patent Literature 1: Japanese Laid-Open Patent Publication No. 04-103859

SUMMARY

Technical Problem

When an abnormality of a sensor for detecting a combustion state of an engine is detected, there is a case where an output state becomes similar to a stack state depending on the combustion state of the engine even when the sensor is in a normal state. Thus, there is a high possibility to make an erroneous determination when a simple determination of one determination cycle is performed. Therefore, it is necessary to perform a determination of a plurality of determination cycles. However, it is not easy to accurately determine a stack abnormality because the combustion state in a cylinder of the engine changes according to a driving state of the engine and a peak value detected by the sensor changes. For example, there is a possibility that a determination cycle occurs in which the sensor value does not reach the output range where the stack is generated until the stack abnormality can be confirmed.

Solution to Problem

According to an aspect of an embodiment, an engine control apparatus for controlling an engine, includes: a stack detecting unit configured to detect a stack state in which a detected value of a sensor for detecting a combustion state of an engine does not change during a determination period based on a drive cycle of the engine; a count processing unit configured to count up a counter when the stack state is detected by the stack detecting unit during the determination period; a stack value storage control unit configured to allow a storage unit to store the detected value by the sensor when the stack state has been detected as a stack value in a case where the stack state is detected by the stack detecting unit during the determination period; and an abnormality determination unit configured to determine that the sensor has a stack abnormality when the count value by the count processing unit becomes equal to or more than an abnormality determination threshold, wherein the count processing unit does not count up the counter and does not reset the counter when the maximum value of the detected value of the sensor detected during the determination period is lower than a value stored in the stack value storage unit and the stack state has not been detected by the stack detecting unit during the determination period.

DESCRIPTION OF EMBODIMENTS

An engine control apparatus and a control method according to the present embodiment will be described below with reference to the drawings. A case is described below where a cylinder pressure sensor is used as an exemplary sensor for detecting a state of the engine. Also, a case is particularly described below where an abnormality of the cylinder pressure sensor is determined as a main control of the engine control apparatus according to the present embodiment. However, the present invention is not limited to the embodiment below.

Figure 1:
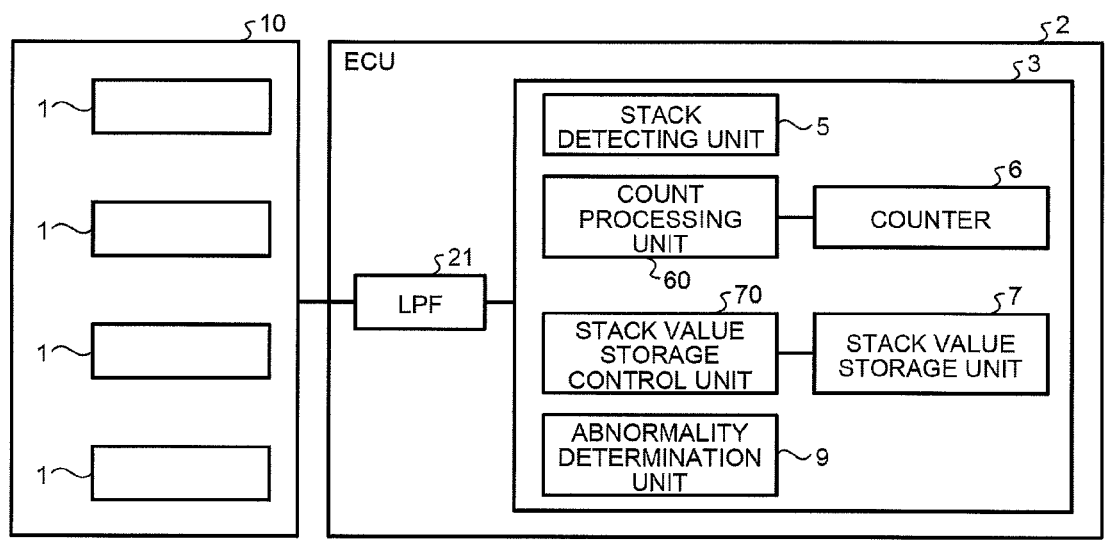
FIG. 1 is a block diagram of an outline of an engine control apparatus according to an embodiment.
Figure 2:
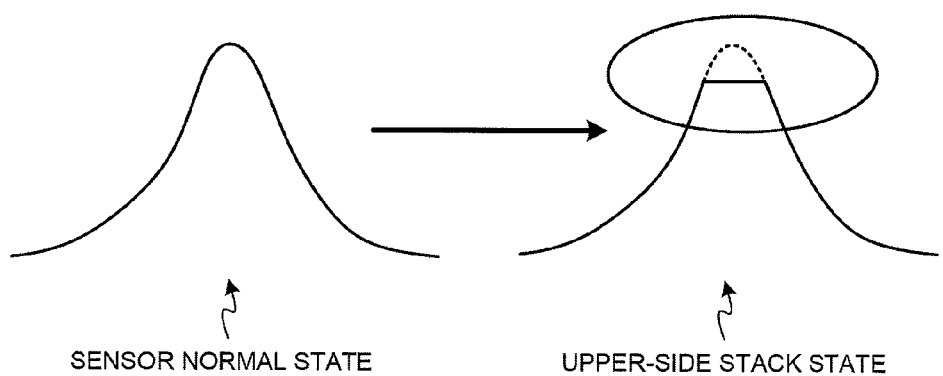
FIG. 2 is an explanatory diagram of an upper-side stack.

First, the engine control apparatus according to the embodiment will be described with reference to FIGS. 1 and 2. FIG. 1 is a block diagram of an outline of the engine control apparatus, and FIG. 2 is an explanatory diagram of an upper-side stack.

The engine control apparatus according to the present embodiment can be, for example, a microcomputer 3 mounted in an engine control unit (ECU) 2 which is employed as a fuel injection control apparatus and the like as illustrated in FIG. 1.

The microcomputer 3 includes a function for calculating a cylinder pressure in a cylinder of the engine and a function for detecting the upper-side stack based on the calculation result. The microcomputer 3 includes a stack detecting unit 5, a count processing unit 60, a stack value storage control unit 70, and an abnormality determination unit 9. Also, the microcomputer 3 is electrically connected to a plurality of cylinder pressure sensors 1 via a low-pass filter (LPF) 21. The plurality of cylinder pressure sensors 1 is provided corresponding to each cylinder of an engine 10. Here, a four-cylinder engine is used as an exemplary engine to be controlled.

Here, the upper-side stack is generated when the cylinder pressure sensor 1 is in an abnormal state which is a so-called stack abnormality. As illustrated in FIG. 2, a sensor value of the cylinder pressure sensor 1 stays at a constant value, and an upper part of a waveform indicating the sensor value changes to a truncated shape from a shape of a normal combustion state. The stack detecting unit 5 of the microcomputer 3 can detect the upper-side stack according to a fluctuation waveform of a detected value of the cylinder pressure sensor 1.

In an automobile, since there is a case where combustion of the engine 10 is controlled by using a physical quantity such as a calorific value calculated by using the detected cylinder pressure, it is preferable to accurately determine the abnormality of the cylinder pressure sensor 1. In addition, it is desirable to easily determine the abnormality of the cylinder pressure sensor 1 without using a complex structure. With a structure illustrated in FIG. 1, the stack abnormality can be accurately detected.

That is, the microcomputer 3 includes a calculation function for calculating the cylinder pressure by converting a voltage into the cylinder pressure and performing various correction. As illustrated in FIG. 1, the microcomputer 3 includes the count processing unit 60 for controlling a stack accumulation counter 6 (there is a case where it is simply referred to as counter 6 below), the stack value storage control unit 70 for controlling a stack value storage unit 7 which is a stack value storage unit, and the abnormality determination unit 9.

The counter 6 has a function for counting the number of the detections of the upper-side stacks by the stack detecting unit 5 for a predetermined period of time, and the counter 6 controls it by the count processing unit 60. The stack value storage unit 7 stores a cylinder pressure value as a stack value P. The cylinder pressure value is detected by the cylinder pressure sensor 1 when the stack detecting unit 5 has detected the upper-side stack. The stack value storage control unit 70 controls the stack value storage unit 7.

Though details will be described below, the abnormality determination unit 9 determines that the cylinder pressure sensor 1 has the stack abnormality when the stack value P stored in the determination period T at the time of the determination start is set as the reference value from among the stack values stored in the stack value storage unit 7 and the count value of the upper-side stack equal to or lower than the reference value from among the count values counted by the counter 6 after the determination start reaches the certain number of times, that is, the count value becomes equal to or more than an abnormality determination threshold.

A method will be particularly described below with reference to FIGS. 3 to 7 in which the abnormality determination unit 9 of the engine control apparatus according to the present embodiment actually determines the stack abnormality of the cylinder pressure sensor 1.

FIGS. 3 to 6 are explanatory diagrams of exemplary determinations of the stack abnormality of the cylinder pressure sensor 1 according to the embodiment. FIG. 7 is an explanatory diagram of a determination flow of the stack abnormality of the cylinder pressure sensor 1 according to the embodiment.

In FIGS. 3 to 7, T indicates a determination period (determination cycle), and it is set based on a drive cycle of the engine. "Cylinder pressure (sensor value)" is illustrated by a waveform in which the cylinder pressure value detected by the cylinder pressure sensor 1 is plotted. "Upper-side stack accumulation counter" indicates a count value which is a counted result by the counter 6. "Upper-side stack determination flag" is a flag indicating the determination result by the abnormality determination unit 9. A circle mark at the right end indicates that it is determined that there be a stack abnormality, and a cross mark at the right end indicates that it is determined that there be no stack abnormality.

Figure 3:
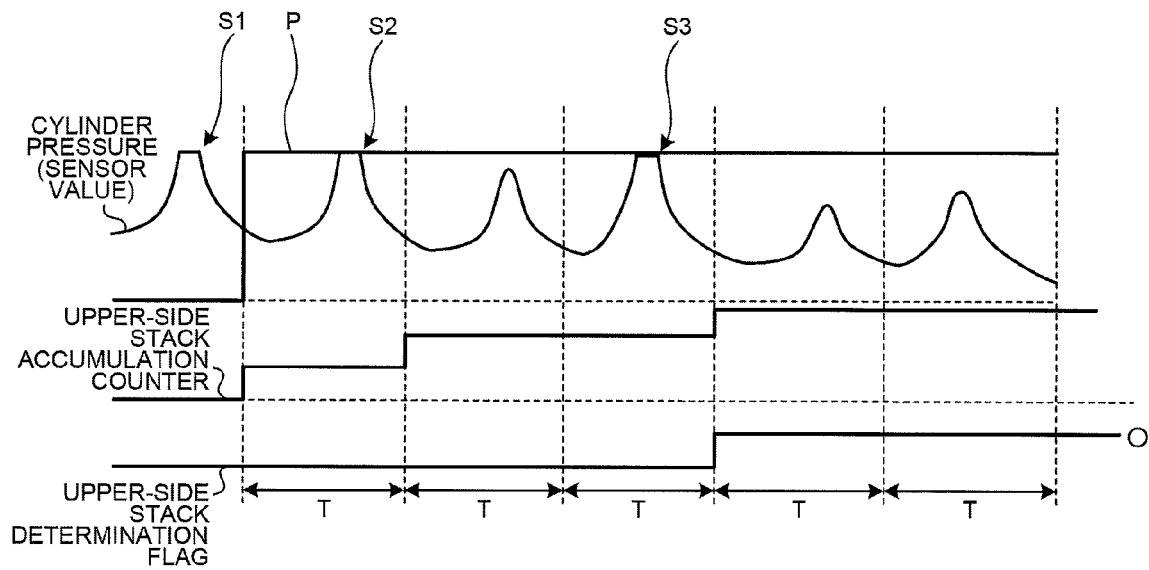
FIG. 3 is an explanatory diagram of an exemplary determination of a stack abnormality.

In the example illustrated in FIG. 3, the abnormality determination unit 9 determines that the cylinder pressure sensor 1 has the stack abnormality when the count value obtained by the count processing unit 60 becomes equal to or more than the abnormality determination threshold. When the maximum value of the detected value of the cylinder pressure sensor 1 detected during the determination period T is lower than the stack value P stored in the stack value storage unit 7 which is the stack value storage unit and the stack state has not been detected by the stack detecting unit 5 during the determination period T, . . . , the count processing unit 60 does not count up the counter 6 and does not reset the counter 6.

That is, after the determination period T (determination cycle) after the stack value P at the time of determination start has been set to the reference value, for example, when detecting low-level upper-side stacks S2 and S3 which is equal to or less than the reference value as illustrated in FIG. 3, the abnormality determination unit 9 counts up the counter value. Then, the abnormality determination unit 9 determines that the cylinder pressure sensor 1 has the stack abnormality when the count value of the upper-side stack equal to or less than the reference value has reached a certain number of times (for example, three times). It is assumed that "equal to or less than the reference value" indicate, for example, a case where a difference from the reference value is within a predetermined value (for example, within 10 KPa).

For example, it is assumed that the stack value P of an upper-side stack S1 at the time of the determination start be the reference value as illustrated in FIG. 3. When the stack detecting unit 5 detects the low-level upper-side stack S2 which is equal to or less than the reference value after the reference value has been set, the count processing unit 60 sets the count value of the counter 6 to two. After that, when the low-level upper-side stack S3 is further detected, the count value of the counter 6 becomes three. When the certain number of times which is to be the reference of the abnormality determination (abnormality determination threshold) is three times, the abnormality determination unit 9 determines that there is the stack abnormality (refer to the circle mark).

For easy understanding, in FIGS. 3 to 6, the count value of the upper-side stack necessary for determining that the cylinder pressure sensor 1 has the stack abnormality is two or three times (certain number of times). However, it is originally preferable that the count value be at least about 100 in order to obtain predetermined detection accuracy.

Figure 4:
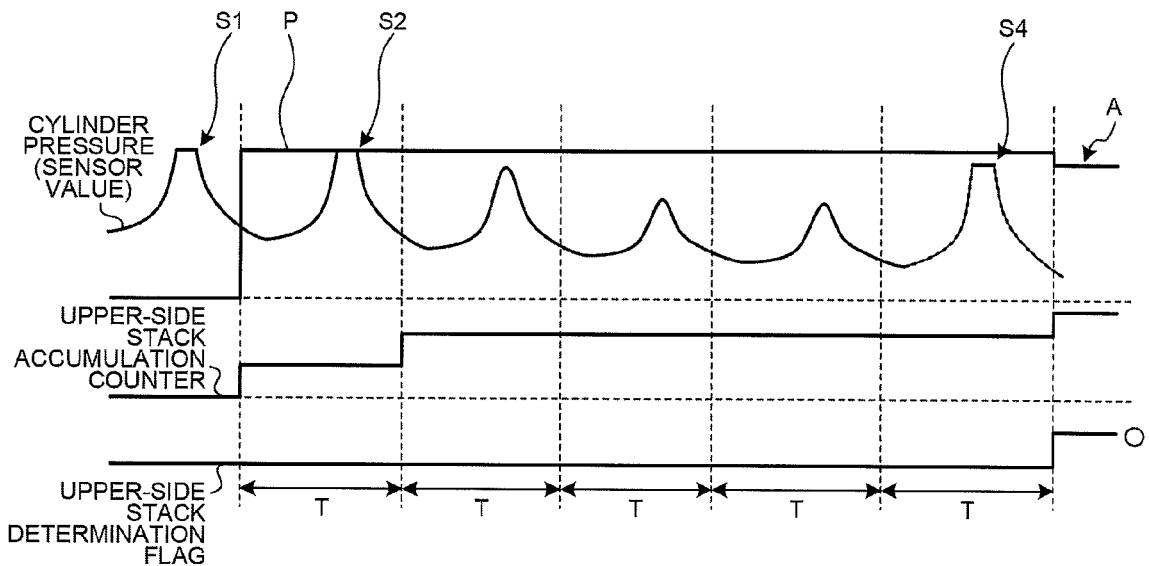
FIG. 4 is an explanatory diagram of an exemplary determination of a stack abnormality.

In the example illustrated in FIG. 4, when the stack detecting unit 5 detects the stack state during the determination period T and the detected value of the cylinder pressure sensor 1 in a case where the stack state has been detected is lower than the stack value P which is the reference value stored in the stack value storage unit 7, the count processing unit 60 counts up of the counter 6. The stack value storage control unit 70 replaces the stack value P as the reference value stored in the stack value storage unit 7 with the detected value newly detected by the cylinder pressure sensor 1.

That is, after the determination period T (determination cycle) after the stack value P at the time of determination start has been set to the reference value, for example, when detecting the low-level upper-side stack S4 which is equal to or less than the reference value as illustrated in FIG. 4, the abnormality determination unit 9 counts up the counter value. At the same time, the abnormality determination unit 9 rewrites the reference value to the sensor value (cylinder pressure value) of the low-level upper-side stack S4. It is assumed that the low-level upper-side stack S4 have the sensor value equal to or less than the reference value here, for example, which falls below the reference value by a value equal to or more than 10 KPa. In this case, the reference value is rewritten to the value indicated by an arrow A. Also, in this case, when the count value of the upper-side stack equal to or less than the reference value reaches the certain number of times (for example, three times), it is determined that the cylinder pressure sensor 1 has the abnormality (refer to the circle mark).

In this way, in this case, it is assumed first that the stack value P of the upper-side stack S1 at the time of the determination start be the reference value. When the stack detecting unit 5 detects the low-level upper-side stack S2 having a difference which is within a predetermined value (for example, within 10 KPa) with the reference value after the reference value has been set, the count value of the counter 6 becomes two. In a cycle after some time, when the low-level upper-side stack S4, which falls below the reference value by equal to or more than a predetermined value (for example, 10 KPa), is detected, the count value of the counter 6 becomes three, and the abnormality determination unit 9 determines that there is the upper-side stack abnormality as illustrated in FIG. 4. However, since the upper-side stack S4 of the lower value has been detected as the sensor value, the reference value after that is rewritten to the value of the low-level upper-side stack S4 (refer to the arrow A). Accordingly, the upper-side stack of the low value which is not preferable can be surely counted, and the sensor abnormality according to the stack abnormality of the cylinder pressure sensor 1 can be accurately detected.

Figure 5:
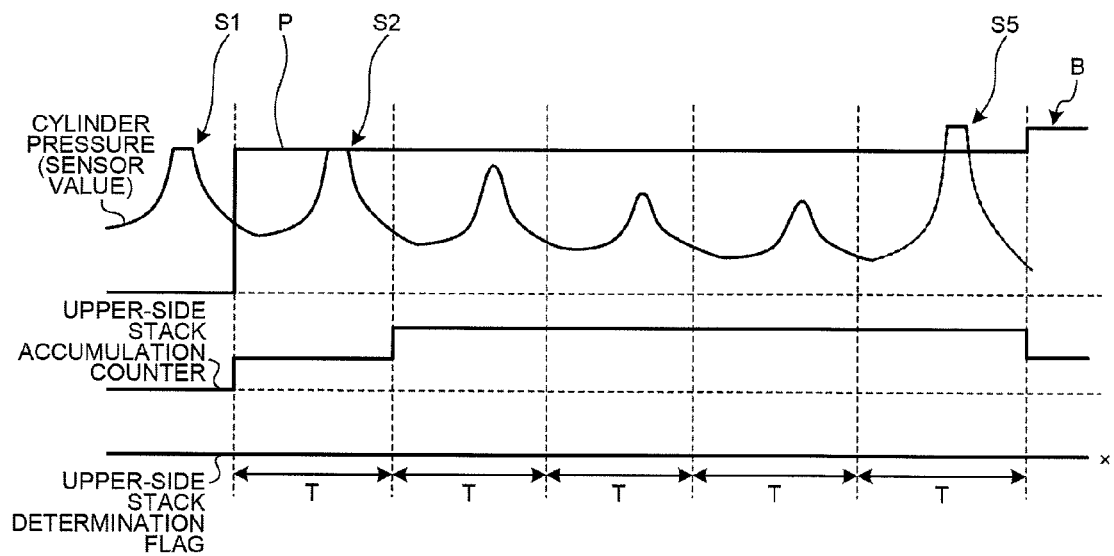
FIG. 5 is an explanatory diagram of an exemplary determination of a stack abnormality.

In the example illustrated in FIG. 5, when the stack detecting unit 5 detects the stack state during the determination period T and the detected value of the cylinder pressure sensor 1 in a case where the stack state has been detected is higher than the stack value P which is the reference value stored in the stack value storage unit 7, the count processing unit 60 returns the counter 6 to a value at the first detection of the stack state and the stack value storage control unit 70 replaces the stack value P as the reference value stored in the stack value storage unit 7 with the detected value newly detected by the cylinder pressure sensor 1.

That is, after the determination period T (determination cycle) after the stack value P at the time of the determination start has been set to the reference value, when a high-level upper-side stack S5 equal to or more than the reference value has been detected, the abnormality determination unit 9 updates the counter value to the default value. At the same time, the abnormality determination unit 9 rewrites the reference value to the cylinder pressure value of the high-level upper-side stack S5 as indicated by an arrow B.

Also, in this case, it is assumed first that the stack value P of the upper-side stack S1 at the time of the determination start be the reference value as illustrated in FIG. 5. When the stack detecting unit 5 detects the low-level upper-side stack S2 having a difference which is within a predetermined value (for example, within 10 KPa) with the reference value after the reference value has been set, the count value of the counter 6 becomes two. When the high-level upper-side stack S5 equal to or more than the reference value is detected in the determination period T (determination cycle) after some time, it can be determined that the upper-side stacks S1 and S2 which have been determined as the stacks be not accurately the stacks. Therefore, the count value of the counter 6 is updated to one as the value at the first detection, that is, the default value. Accordingly, the abnormality determination unit 9 does not determine at this point of time that there is the upper-side stack abnormality (refer to the cross mark). Also, the reference value from the next determination is rewritten to the cylinder pressure value (sensor value) of the upper-side stack S5.

Figure 6:
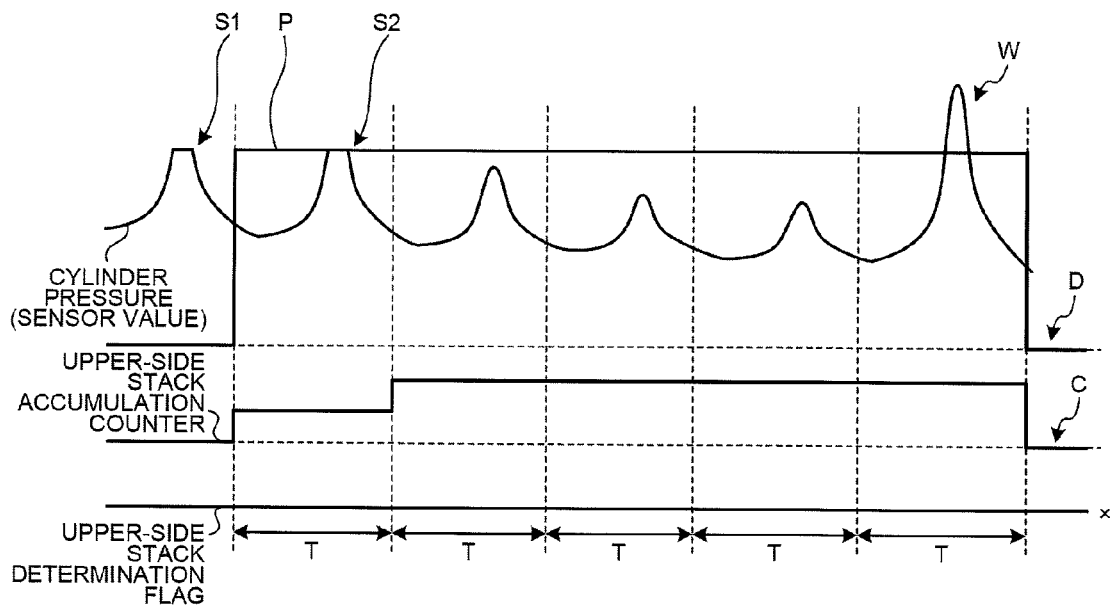
FIG. 6 is an explanatory diagram of an exemplary determination of a stack abnormality.
Figure 7:
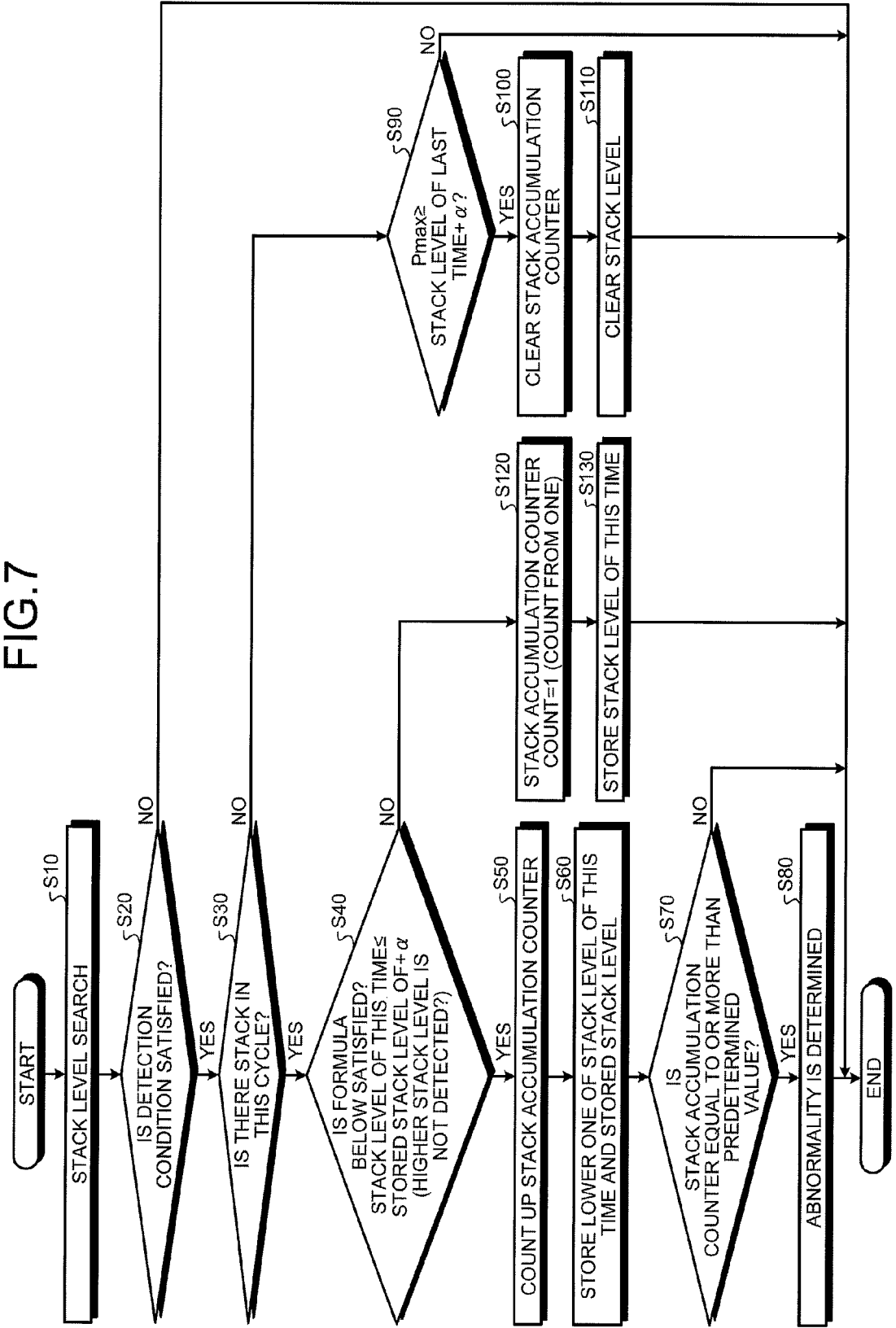
FIG. 7 is an explanatory diagram of the determination of the stack abnormality.

In the example illustrated in FIG. 6, when the stack detecting unit 5 does not detect the stack state during the determination period T and a value, which is higher than the stack value P which is the reference value stored in the stack value storage unit 7 as the detected value detected by the cylinder pressure sensor 1 during the determination period T when the stack state has not been detected, has been detected, the count processing unit 60 resets the counter 6.

That is, when detecting a normal waveform W equal to or more than the reference value after the determination period T (determination cycle) after the stack value P at the time of the determination start has been set to the reference value, the abnormality determination unit 9 clears the counter value.

Also, in this case, it is assumed first that the stack value P of the upper-side stack S1 at the time of the determination start be the reference value as illustrated in FIG. 5. When the stack detecting unit 5 detects the low-level upper-side stack S2 having a difference which is within a predetermined value (for example, within 10 KPa) with the reference value after the reference value has been set, the count value of the counter 6 becomes two. When the normal waveform W equal to or more than the reference value is detected in the determination period T (determination cycle) after some time, it can be determined that the upper-side stacks S1 and S2, which have been determined as the stacks, be not accurately stacks and a new upper-side stack cannot be detected. Therefore, the count value of the counter 6 is cleared and becomes zero at this time (refer to an arrow C). Therefore, the abnormality determination unit 9 cannot determine that there is the upper-side stack abnormality in this case (refer to the cross mark). In addition, the reference value is cleared (refer to an arrow D), and the abnormality determination unit 9 determines from the beginning again.

Next, a flow of abnormality determination processing of the cylinder pressure sensor 1 will be described with reference to FIG. 7. After the cycle after the value at the time of the determination start has been set to the reference value, the flow of the procedure in this case proceeds from when the low-level upper-side stack which falls below the reference value by equal to or less than the predetermined value α (for example, 10 KPa) has been detected (refer to FIG. 4), and when the high-level upper-side stack S5 equal to or more than the reference value has been detected (refer to FIG. 5), and then, when the normal waveform W equal to or more than the reference value has been detected (FIG. 6).

As illustrated in FIG. 7, a controller 4 performs first a stack level search (step S10). That is, the stack detecting unit 5 searches for the upper-side stack near the maximum value detected by the cylinder pressure sensor 1.

It is determined whether a detection condition is satisfied (step S20). That is, it is determined whether the cylinder pressure value of a case where the microcomputer 3 including the controller 4 and the stack detecting unit 5 has been booted and has detected the upper-side stack at the time of the determination start has been set to the reference value. When the detection condition has not been satisfied (step S20: No), the abnormality determination processing is terminated. On the other hand, when the detection condition has been satisfied (step S20: Yes), the procedure proceeds to step S30.

In step S30, the controller 4 determines whether there is the stack in this cycle. That is, the controller 4 determines whether the upper-side stack has been detected after the reference value has been set. When there is no upper-side stack (step S30: No), the procedure proceeds to step S90.

On the other hand, when there is the upper-side stack (step S30: Yes), it is determined whether a cylinder pressure value of the newly detected upper-side stack is equal to or less than the reference value+α (stack level of this time stack level of the last time+α) (step S40). That is, it is determined whether the stack level higher than the reference value is not detected. In other words, it is determined whether the low-level upper-side stack which is same as the reference value or has a low value within the predetermined value (for example, 10 KPa) from the reference value has been generated.

When the low-level upper-side stack within the predetermined value (for example, 10 KPa) from the reference value has been generated (step S40: Yes), the controller 4 counts up the stack accumulation counter 6 (step S50). Subsequently, the controller 4 lowers the stack level (step S60). That is, the controller 4 counts up the counter value of the counter 6 in step S50, and a value is stored in step S60 which is lower one of two, i.e., the stack level of this time and the stored stack level. That is, the reference value is rewritten to the cylinder pressure value of the low-level upper-side stack (refer to FIG. 4).

On the other hand, when the low-level upper-side stack within the predetermined value (for example, 10 KPa) from the reference value is not generated and the higher stack level (high-level upper-side stack) has been detected instead (step S40: No), the controller 4 updates the count of the stack accumulation counter 6 to one (step S120). Subsequently, the controller 4 increases the stack level by storing the stack level of this time (step S130). That is, the controller 4 updates the counter value of the counter 6 to the default value (here, one) in step S120, and the reference value is rewritten to the cylinder pressure value of the high-level upper-side stack in step S130 (refer to FIG. 5).

In step S30, the controller 4 determines whether the maximum cylinder pressure value≥the stack level of the last time+α is satisfied in the processing of step S90 in a case where there is no upper-side stack. That is, it is determined whether the normal waveform W, which exceeds the reference value by a value equal to or more than a predetermined value α (for example, 10 KPa), has been detected.

When the normal waveform W which exceeds the reference value by the value equal to or more than the predetermined value α (for example, 10 KPa) has not been detected (step S90: No), the abnormality determination processing is terminated. On the other hand, when the normal waveform W above has been detected (step S90: Yes), the controller 4 clears the stack accumulation counter 6 (step S100), and then the controller 4 also clears the stack level (step S110). That is, the counter value of the counter 6 is set to be zero in step S100, and the reference value is cleared in step S110 (refer to FIG. 6).

As described above, when determining the abnormality of the cylinder pressure sensor 1, the engine control apparatus according to the present embodiment determines the stack abnormality of the cylinder pressure sensor 1 by using a control method including processes below.

(1) A stack detecting process for detecting the stack state in which the detected value of the cylinder pressure sensor 1 for detecting the combustion state of the engine does not change during the determination period T based on the drive cycle of the engine.

(2) A count processing process for counting up the counter 6 when the stack state is detected according to the stack detecting process during the determination period T.

(3) A stack value storing process in which the stack value storage unit 7 stores the detected value of the sensor at the time when the stack state has been detected as the stack value P when the stack state is detected according to the stack detecting process during the determination period T.

(4) An abnormality determination process for determining that the cylinder pressure sensor 1 has a stack abnormality when the count value according to the count processing process becomes equal to or more than the abnormality determination threshold.

In this case, when the maximum value of the detected value of the cylinder pressure sensor 1 detected during the determination period T is lower than the stack value P which is the reference value stored in the stack value storing process and the stack state has not been detected by the stack detecting process during the determination period T, the counter is not counted up and is not reset in the count processing process.

Also, the above processes can be replaced with processes below.

(a) A stack detecting process for detecting the upper-side stack according to a fluctuation waveform of the detected value of the cylinder pressure sensor 1.

(b) A counting process for counting the number of times of the detection of the upper-side stack according to the stack detecting process.

(c) A first storing process for storing the cylinder pressure value which is detected by the cylinder pressure sensor 1 when the upper-side stack has been detected according to the stack detecting process as the stack value.

(d) A second storing process for storing the counter value which is a count result according to the counting process.

(e) A determining process for determining that the cylinder pressure sensor 1 has an abnormality when a value at the time of determination start from among the stack values stored in the first storing process is set to the reference value and the count value of the upper-side stack equal to or less than the reference value from among the counter values stored in the second storing process after the determination start has been reached a certain number of times.

The present invention has been described above with reference to the embodiment. However, for example, the stack abnormality can be very easily and accurately detected according to the engine control apparatus and the engine control method according to the present embodiment.

Therefore, the sensor abnormality can be early and accurately detected, and the appropriate measures such as repair and replacement can be taken. An automatic fuel control and the like by using the cylinder pressure value in an automobile engine and the like can be performed constantly without any problem, and the possibility can be reduced in which fuel consumption is reduced.

In the above-mentioned embodiment, the engine is a general four-stroke engine and the sensor is the cylinder pressure sensor 1 provided in each cylinder of the engine. However, the sensor may be a single sensor used by all the cylinders in common such as an exhaust pressure sensor. In this way, the determination period T (determination cycle) can be appropriately set according to a kind of the sensor and characteristics of a signal detected by the sensor.

Also, an abnormality detection apparatus of the cylinder pressure sensor according to the present embodiment has been described as an apparatus mounted on the automobile. However, it is not limited to the automobile and may be any vehicles for using the engine as a power source.

Also, the sensor is not limited to the cylinder pressure sensor 1 and may be an appropriate sensor to detect various situations including the combustion state of the engine and the like. As the engine control method in this case, the cylinder pressure sensor 1 is changed to a predetermined sensor to be read in the above-mentioned process.

Also, a further effect and other modifications can be easily perceived by those skilled in the art. Therefore, a wide range of the aspects of the present invention is not limited to specific details expressed and described above and a typical embodiment. Accordingly, various modifications can be applied without departing from the general spirit and scope of the present invention defined by attached claims and equivalents of the same.

The invention claimed is:

1. An engine control apparatus for controlling an engine, comprising:
   a stack detecting unit configured to detect a stack state in which a detected value of a sensor for detecting a combustion state of an engine does not change during a determination period based on a drive cycle of the engine;
   a count processing unit configured to count up a counter when the stack state is detected by the stack detecting unit during the determination period;
   a stack value storage control unit configured to allow a storage unit to store the detected value by the sensor when the stack state has been detected as a stack value in a case where the stack state is detected by the stack detecting unit during the determination period; and
   an abnormality determination unit configured to determine that the sensor has a stack abnormality when the count value by the count processing unit becomes equal to or more than an abnormality determination threshold, wherein
   the count processing unit does not count up the counter and does not reset the counter when the maximum value of the detected value of the sensor detected during the determination period is lower than a value stored in the storage unit and the stack state has not been detected by the stack detecting unit during the determination period.

2. The engine control apparatus according to claim 1, wherein
   the count processing unit counts up the counter and the stack value storage control unit replaces the stack value to be stored in the storage unit with the detected value newly detected by the sensor when the stack state is detected by the stack detecting unit during the determination period and the detected value of the sensor when the stack state has been detected is lower than the stack value stored in the storage unit.

3. The engine control apparatus according to claim 1, wherein
   the count processing unit returns the counter to a value at the time of a first detection of the stack state and the stack value storage control unit replaces the stack value to be stored in the storage unit with the detected value newly detected by the sensor when the stack state is detected by the stack detecting unit during the determination period and the detected value of the sensor when the stack state has been detected is higher than the stack value stored in the storage unit.

4. The engine control apparatus according to claim 1, wherein
   the count processing unit resets the counter when the stack state is not detected by the stack detecting unit during the determination period and a value higher than the stack value stored in the storage unit has been detected as the detected value detected by the sensor during the determination period when the stack state has not been detected.

5. The engine control apparatus according to claim 1, wherein
   the sensor is a cylinder pressure sensor.

6. A control method for an engine, comprising:
   a stack detecting process for detecting a stack state in which a detected value of a sensor for detecting a combustion state of an engine does not change during a determination period based on a drive cycle of the engine;
   a count processing process for counting up a counter when the stack state is detected by the stack detecting process during the determination period;
   a stack value storing process for allowing a storage unit to store the detected value by the sensor when the stack state has been detected as a stack value in a case where the stack state is detected by the stack detecting process during the determination period; and
   an abnormality determination process for determining that the sensor has a stack abnormality when the count value by the count processing process becomes equal to or more than an abnormality determination threshold, wherein
   the counter is not counted up and is not reset in the count processing process when the maximum value of the detected value of the sensor detected during the determination period is lower than a value stored in the stack value storing process and the stack state has not been detected by the stack detecting process during the determination period.

* * * * *